(12) United States Patent
Su et al.

(10) Patent No.: US 7,114,696 B1
(45) Date of Patent: Oct. 3, 2006

(54) DISPOSABLE MOLDS AND METHOD OF USING THE SAME

(75) Inventors: Kai Su, Alpharetta, GA (US); Richard Lu, Alpharetta, GA (US)

(73) Assignee: QSPEX, LLC, Alpharetta, GA (US)

( * ) Notice: Subject to any disclaimer, the term of this patent is extended or adjusted under 35 U.S.C. 154(b) by 0 days.

(21) Appl. No.: 11/215,361

(22) Filed: Aug. 29, 2005

(51) Int. Cl.
*B29D 11/00* (2006.01)

(52) U.S. Cl. .................... 249/102; 249/105; 249/134; 425/183; 425/808; 425/812

(58) Field of Classification Search ........... 425/470, 425/808, 812, 183; 249/105, 134, 135, 102
See application file for complete search history.

(56) References Cited

U.S. PATENT DOCUMENTS

| | | | |
|---|---|---|---|
| 3,946,982 A * | 3/1976 | Calkins et al. ............. | 249/102 |
| 4,284,399 A | 8/1981 | Newcomb et al. | |
| 4,338,269 A | 7/1982 | Russell | |
| 4,640,489 A | 2/1987 | Larsen | |
| 4,758,448 A * | 7/1988 | Sandvig et al. ............ | 351/166 |
| 4,919,850 A | 4/1990 | Blum et al. | |
| 5,036,971 A | 8/1991 | Seden et al. | |
| 5,049,321 A | 9/1991 | Galic | |
| 5,143,660 A | 9/1992 | Hamilton et al. | |
| 5,254,000 A | 10/1993 | Friske et al. | |
| 5,260,001 A | 11/1993 | Nandu et al. | |
| 5,524,419 A | 6/1996 | Shannon | |
| 5,551,663 A | 9/1996 | Bae et al. | |
| 5,804,107 A | 9/1998 | Martin et al. | |
| 5,922,249 A | 7/1999 | Ajello et al. | |
| 5,981,618 A | 11/1999 | Martin et al. | |
| 6,068,464 A | 5/2000 | Su et al. | |
| 6,099,764 A | 8/2000 | Su et al. | |
| 6,103,148 A | 8/2000 | Su et al. | |
| 6,241,505 B1 | 6/2001 | Buazza et al. | |
| 6,565,776 B1 | 5/2003 | Li et al. ...................... | 264/2.5 |
| 6,772,988 B1 | 8/2004 | Altmann ..................... | 249/134 |
| 2003/0041287 A1 | 2/2003 | Kazar | |
| 2003/0057578 A1* | 3/2003 | Haidl et al. ................ | 264/1.36 |
| 2004/0041287 A1 | 3/2004 | Engardio et al. ........... | 264/1.7 |
| 2004/0099971 A1* | 5/2004 | Su et al. .................... | 264/1.32 |

FOREIGN PATENT DOCUMENTS

WO WO 03-068416 8/2003

OTHER PUBLICATIONS

U.S. Appl. No. 10/075,687, filed Feb. 2002, Su et al.
U.S. Appl. No. 10/992,224, filed Nov. 2004, Su et al.
U.S. Appl. No. 10/992,225, filed Nov. 2004, Su et al.

(Continued)

*Primary Examiner*—Donald Heckenberg
(74) *Attorney, Agent, or Firm*—Merchant & Gould

(57) ABSTRACT

The present invention encompasses, in part, a method and apparatus for lens casting in which two molds, preferably formed of plastic, are interconnected or joined together via a ring to form a mold cavity having substantially the same dimensions of the lens to be formed therein. In one implementation the invention includes a the casting device comprising a plurality of front molds, each front mold formed of a plastic and having a lens-forming surface. The front molds are configured to form a plurality of lenses of different effective diameters. The casting device further includes a rear mold formed of a plastic and having a lens-forming surface; wherein the rear mold is configured to be paired with each of the plurality of front molds to form a plurality of lenses of different effective diameters.

12 Claims, 6 Drawing Sheets

OTHER PUBLICATIONS

U.S. Appl. No. 11/188,223, filed Jul. 2005, Su et al.
International Search Report and Opinion, International Application No. PCT/US05/41915, Jun. 28, 2006.
International Search Report and Opinion, International Application No. PCT/US05/41619, Apr. 11, 2006.
U.S. Appl. No. 10/095,130.
U.S. Appl. No. 10/096,428.
U.S. Appl. No. 10/992,224.

* cited by examiner

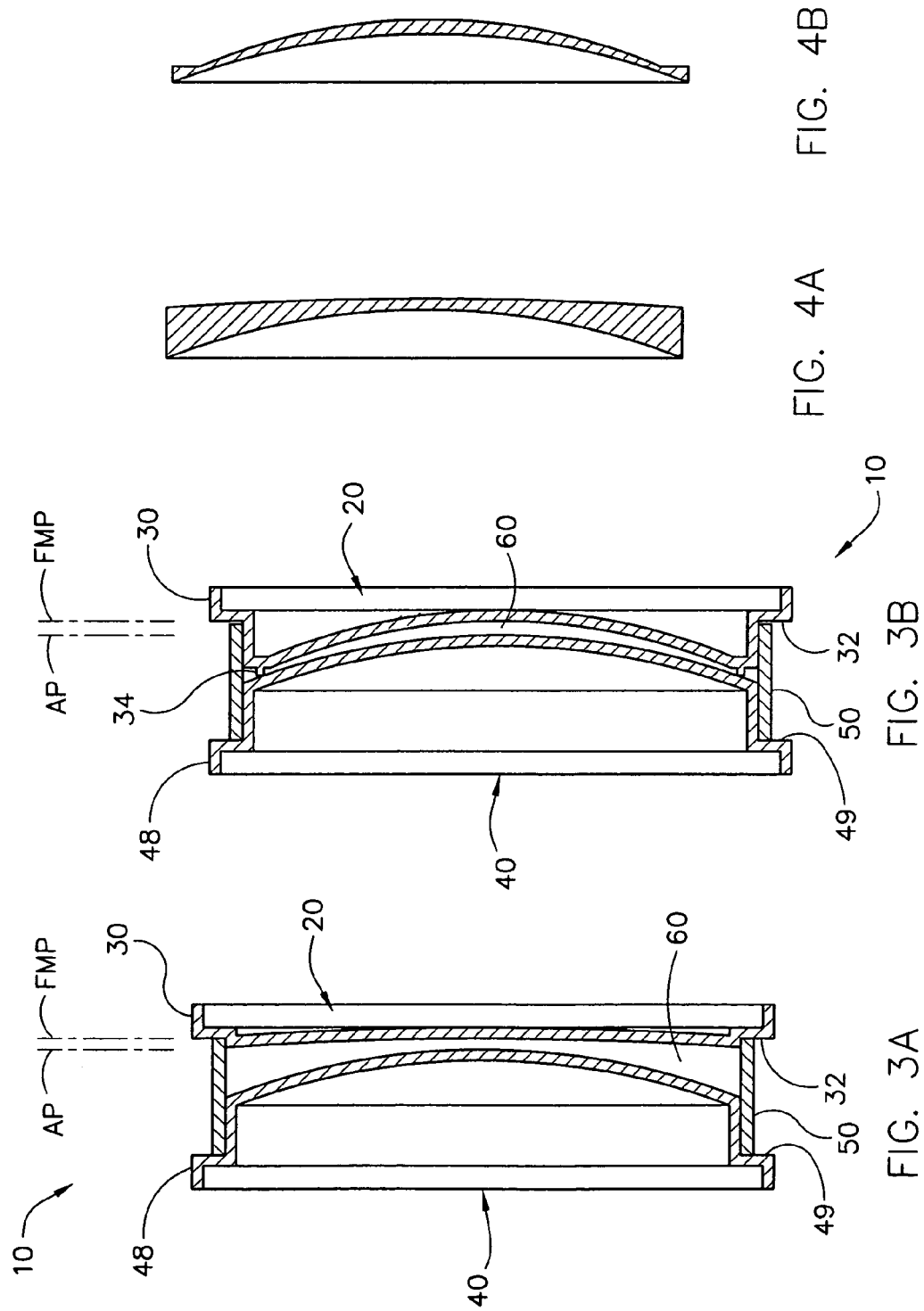

DISPOSABLE MOLDS AND METHOD OF USING THE SAME

FIELD OF THE INVENTION

The present invention encompasses, in part, a method and apparatus for lens casting in which two molds, preferably formed of plastic, are interconnected or joined together via a ring to form a mold cavity having substantially the same dimensions of the lens to be formed therein. The invention is further directed to compositions and methods used in lens casting.

BACKGROUND

The art of casting lenses involves introducing a lens-forming material, such as a monomer or monomer mixture, into a volume and then polymerizing the lens-forming material to become a solid. The formed lens can be used for ophthalmic or specialty optics applications. Ophthalmic devices have traditionally been created by first forming a cavity out of two separate mold shapes, then filling that cavity with a liquid material that will cure and form a solid shape. The molds used in this type of process are typically glass or metal, based on their high chemical resistance and low amount of geometric distortion they experience over time.

Most commonly, two glass mold pieces and a gasket form the volume that defines the dimensions of the lens to be cast. Some prior art gaskets are known as "T-gaskets," which include a bore having two ends that each complementarily receives a respective glass mold spaced apart a predetermined axial distance from the other mold. Different T-gaskets are required to form varying power lenses because they only allow one separation distance between molds. Accordingly, manufacturers must maintain T-gaskets for a +2 lens, another for a −3 lens, still another for a −4 lens, etc.

An improvement of this "T-gasket" design is disclosed in U.S. Pat. No. 6,068,464 (hereafter "the '464 patent"), in which at least one of the two molds is slidably movable along the bore of the gasket. This design thus has a "universal" gasket that can be used to form different powers of lenses, whereas a given prior art T-gasket may be used to form one power of lens and a different T-gasket is used to form another power.

U.S. Pat. No. 5,551,663 (hereafter "the '663 patent") described the use of plastic molds in the manufacture of ophthalmic lenses, but no mention of successfully making lenses is included here. This approach necessitated the use of a "protective coating" first being applied to the mold before the mold could be used. This protective coating became a permanent part of the mold, and allowed for the mold to be used repeatedly. Evidence of the permanence of the coating is apparent in the description of the adhesion test used to assure proper adhesion of the coating to the mold. The patent describes a "plastic mold having an adherent, abrasion resistant, release enhancing face." The purpose of the coating of the '663 patent is to prevent attack of the mold by the lens material. (By comparison, this current patent application applies a coating to the mold, but with the intent that the coating be only temporary, and that it transfer via chemical or physical bonding to the lens material.)

The method of the '663 patent raises significant issues about its ability to consistently produce high-quality molded lenses. Possible problems that might occur with the method of the '663 patent include a decay in the optical quality of the mold. Any defect on either side of the mold could affect the finished quality of the lens. The decay can take the form of yellowing, cracking, scratching, and physical deformation. These forms of decay can occur with repeated use of a non-rigid material. Any of these types of decay could alter the optical quality of lenses made. Additionally, plastic materials would be difficult to clean, since they are not very chemically resistant, not scratch resistant, and not very resistant to the heat used in many typical processes.

Accordingly, a need exists for durable, low cost plastic molds that can be used to create lenses of various powers.

SUMMARY OF THE INVENTION

The present invention comprises a method and apparatus for casting a lens, and chemical compositions used to perform the same.

In one implementation of the invention, a front mold and a rear mold formed of a plastic are joined together or interconnected via a ring to form a mold cavity having substantially the same dimensions of the lens to be cast. Stated differently, surfaces of the ring and front and rear molds collectively define a volume known as the mold cavity, which is a negative image of the lens to be formed therein.

More specifically, the front mold has a lens-forming surface and an edge circumscribing the lens-forming surface. The rear mold similarly has a lens-forming surface and an edge circumscribing its lens-forming surface. The lens-forming surfaces of the front and rear molds are each of a size to be complementarily received by and within the interior periphery of the ring. The molds have backing members, which stop the insertion of molds when their respective lens-forming surfaces reach a predetermined point within the ring so that the spacing between the two lens-forming surfaces is at a desired separation distance. This desired separation corresponds to the thickness of the mold cavity, which dictates the thickness and power of the lens formed by the casting device.

The molds of the present invention may be designed to cast lenses of different powers, as well as lenses of different effective diameters using a common rear mold. The effective diameter corresponds to the diameter of the lens that is designed to be a portion of the finished lens after it has been trimmed to fit a pair of eyeglasses. That is, for a lens with given optical surfaces, the lens thickness can be altered by manufacturing the front and/or rear molds having their backing member at one of a plurality of distances from the respective lens-forming surface. Alternatively, the length or height of the ring may be changed to vary the thickness of the mold cavity. Another alternative is to include a plurality of protrusions adjacent the edge of one of the lens forming surfaces, in which the height of the protrusions establishes the edge thickness of the mold cavity.

The present invention additionally allows for a disposable plastic mold to be used in the ophthalmic casting process, either with the disclosed apparatus or in other systems known in the art. This disposable mold can be made out of a variety of amorphous thermoplastics, and can be used to make a lens with or without a variety of coating scenarios. The lenses formed using this process are impact resistant, can have any refractive index, can be (for example) clear (no tint), tinted or photochromic, and can be used for "dress" or safety purposes.

In one implementation the invention includes a casting device comprising a plurality of front molds, each front mold formed of a plastic and having a lens-forming surface. The front molds are configured to form a plurality of lenses of different effective diameters. The casting device further includes a rear mold formed of a plastic and having a lens-forming surface; wherein the rear mold is configured to be paired with each of the plurality of front molds to form a plurality of lenses of different effective diameters.

BRIEF DESCRIPTION OF THE FIGURES OF THE DRAWINGS

FIG. 3A is a side cross-sectional view of the components in FIG. 1 assembled.

FIG. 3B is an alternative design of the casting system shown in FIG. 3A, in which the front mold of FIG. 2B is included.

FIG. 4A is a lens formed by the casting system shown in FIG. 3A.

FIG. 4B is a lens formed by the casting system shown in FIG. 3B.

DETAILED DESCRIPTION OF THE INVENTION

Figure 1:
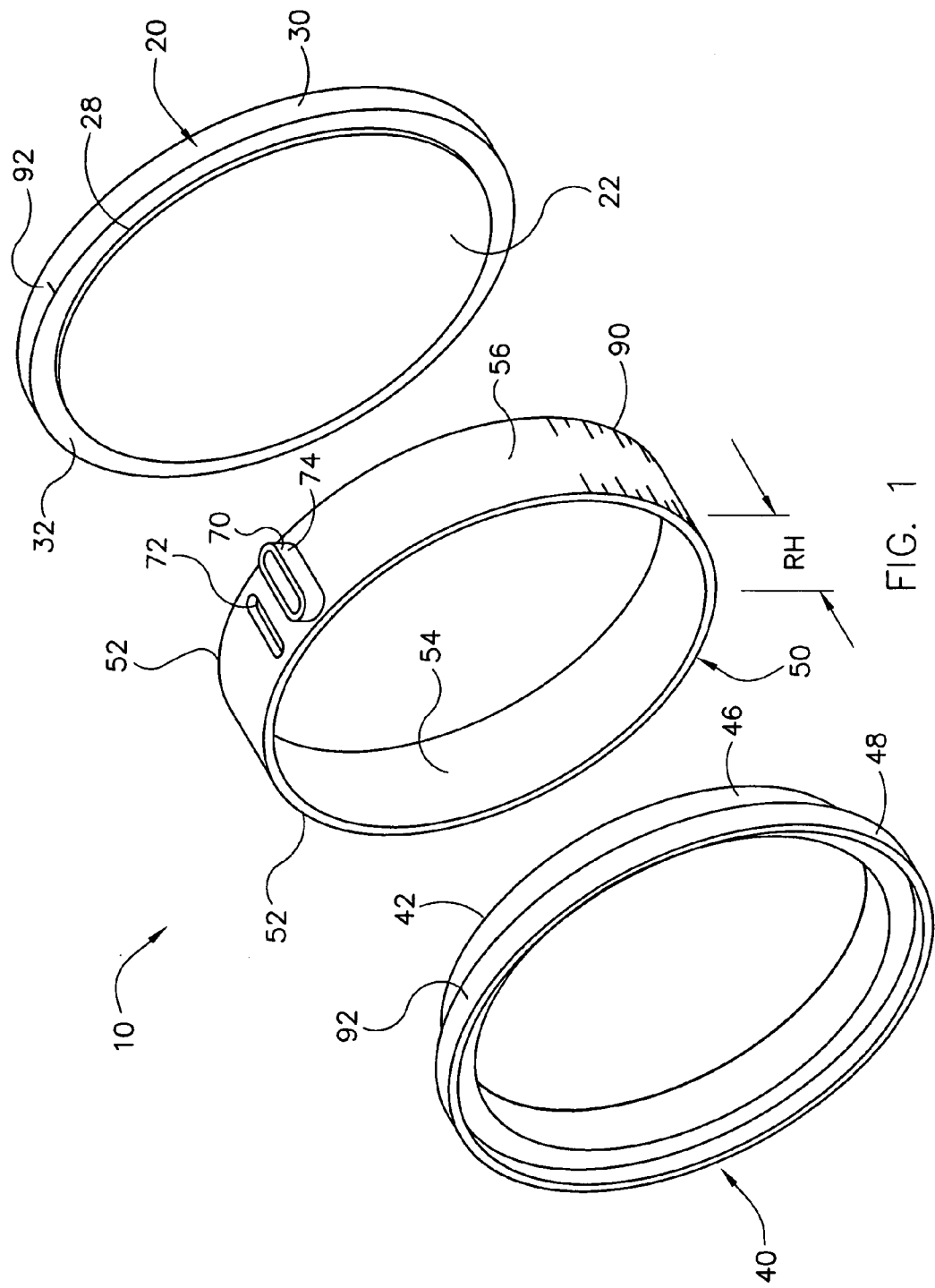
FIG. 1 is an exploded perspective view of an exemplary embodiment of a casting system used with the present invention.

The present invention is more particularly described in the following detailed description, including examples. These examples are intended as illustrative of the invention, and numerous modifications and variations therein will be apparent to those skilled in the art while staying within the scope of the invention. As used in the specification and in the claims, "a," "an," or "the" can mean one or more, depending upon the context in which it is used.

A first embodiment is now described with reference to the figures, in which like numbers indicate like parts throughout the figures. The present invention comprises a molding or casting device 10 and an associated method that may be used to form lenses of various powers and geometric shapes, such as spectacle lenses. The present invention additionally comprises methods for making ophthalmic lenses using disposable plastic molds.

In this discussion, first one exemplary embodiment of a casting system comprising plastic components is discussed in the context of the components and method of those components. This first discussion provides context for and is followed by the aspects of the present invention that involve casting ophthalmic lenses using plastic molds. This latter discussion is not intended to be limited to the exemplary embodiment of the casting system disclosed herein.

Lens Casting Devices

Referring now to FIGS. 1–7, the casting device 10 of the present invention includes a front mold 20 and a rear mold 40, both of which are preferably formed of plastic. The casting device 10 also includes a ring 50, which may also be referred to as a sleeve or gasket. The ring 50 is also preferably formed of plastic and has opposed ends 52, an interior periphery 54, and an exterior periphery 56. As discussed below, portions of the front and rear molds 20, 40 are complementarily received by and into the interior periphery 54 to form a mold cavity 60.

The front mold 20 has a lens-forming surface 22, an edge 28 circumscribing the lens-forming surface 22, and a base 30 having dimensions greater than the interior periphery 54. The edge 28 circumscribing the lens-forming surface 22 is sized to be complementarily received within a portion of the interior periphery 54 of the ring 50 and preferably form a substantially liquid-tight seal therebetween. The edge 28 is slidably received within the interior periphery 54 of the ring 50 until the base 30 abuts the end 52 into which the edge 28 was inserted.

The rear mold 40 likewise has a lens-forming surface 42, a rim 46 circumscribing the lens-forming surface 42, and a flange 48 having dimensions greater than the interior periphery 54 of the ring 50. The rim 46 is also sized to be complementarily received within the interior periphery 54 of the ring 50, which occurs until the end 52 of the ring 50 abuts the flange 48. The rim 46 and the interior periphery 54 also preferably form a substantially liquid-tight seal therebetween.

As shown in FIGS. 3A and 3B, when the edge 28 of the front mold 20 and the rim 46 of the rear mold 40 are both received by the respective ends of the ring 50, the lens-forming surfaces 22, 42 of the front and rear molds 20, 40 and the ring 50 form a mold cavity 60 which has dimensions of a desired lens formable therein. That is, the mold cavity 60 is a replica image of the lens to be formed and has a volume defined by the ring 50, front mold 20, and rear mold 40.

Figure 5:
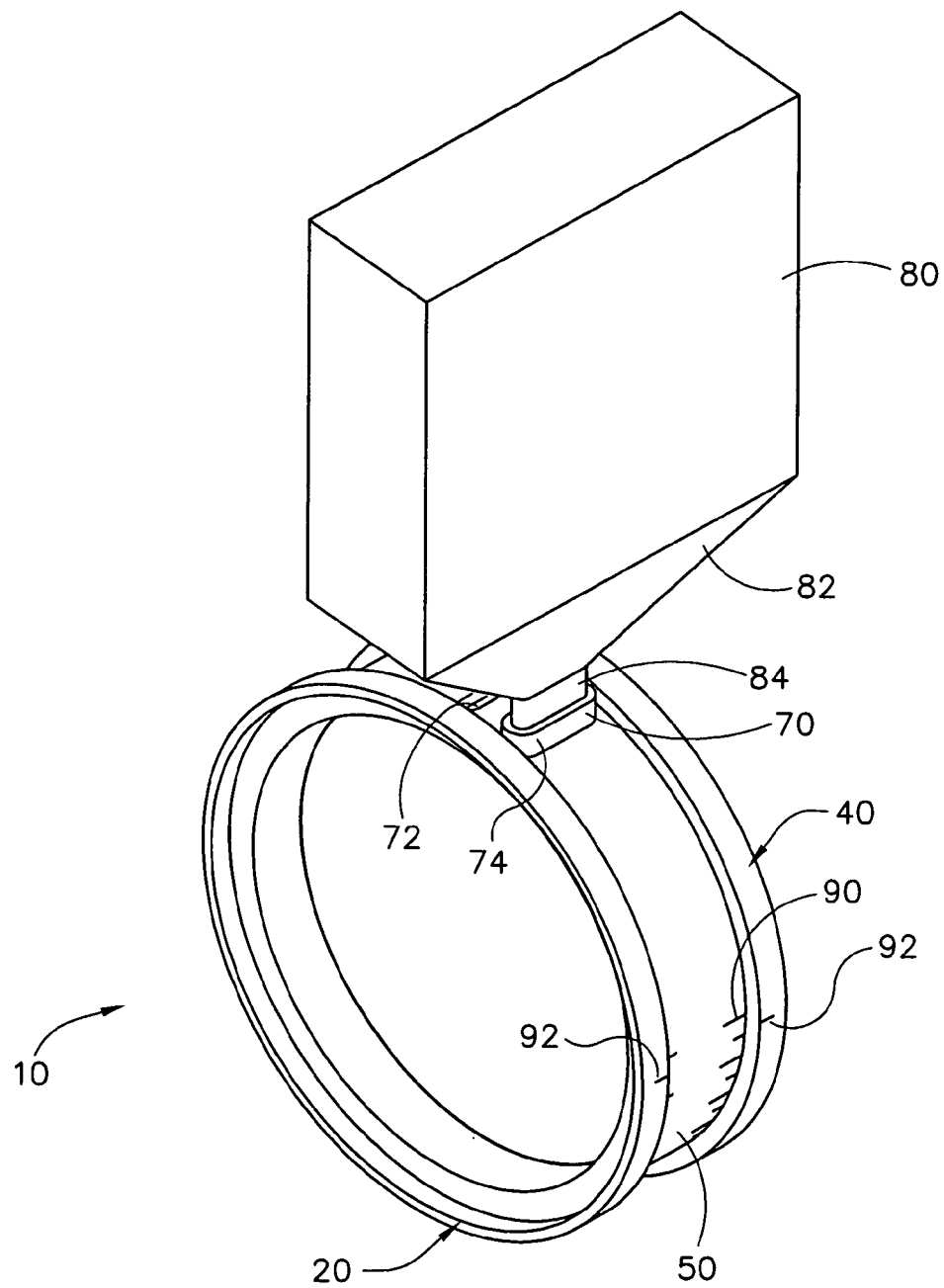
FIG. 5 is a perspective view of the casting system of FIG. 1 connected to a fill bag containing monomer.

To form a lens once the ring 50 and front and rear molds 20, 40 are properly joined or positioned together, a resin, such as a monomer or other lens-forming fluid, is added or injected into the mold cavity 60 and cured. To that end, the ring 50 defines a feed opening 70 and a vent opening 72 therethrough, which are shown in FIGS. 1 and 5. The vent opening 72 provides fluid communication from the mold cavity 60 to outside of it (i.e., to ambient).

As best shown in FIGS. 1 and 5, when the front and rear molds 20, 40 are disposed upright, then the mold cavity 60 is substantially circular in plan view and the vent opening 72 is positioned at approximately the top center (the 12:00 o'clock position). The feed opening 70 is preferably offset from the vent opening 72, and one contemplated range for this offset is by approximately fifteen to ninety degrees (15°–90°). Still referring to FIGS. 1 and 5, it will be noted that an extender 74 is joined to the feed opening 70. The top of the extender in communication with the feed opening 70 and is elevationally above the vent opening 72, which ensures that the cavity is full when the monomer reaches the top of the extender 74. It will further be noted that preferably the feed opening 70 is an elongated slot that extends across the width of the ring 50. This design ensures that communication exists with the mold cavity 60 through the feed opening 70 regardless of the placement of the molds relative to the ring, which may change when used for casting minus lenses verses plus lenses.

A key dimension of the formed mold cavity 60 is its thickness. For minus lenses used for nearsightedness or myopia shown for example in FIG. 4A, the center thickness is an important parameter, and it must satisfy impact testing required in the United States. As an example, plastic lenses formed of CR39 (which includes methyl-methacrylate—a thermoplastic resin better known by its trademark "Plexiglas"® or "Perspex"®—and diallyl glycol carbonate) must have a center thickness of at least two millimeters (2 mm). The preferred embodiment of the present invention is designed to be able to form both plus and minus lenses that satisfy these respective criteria.

Figure 2A:
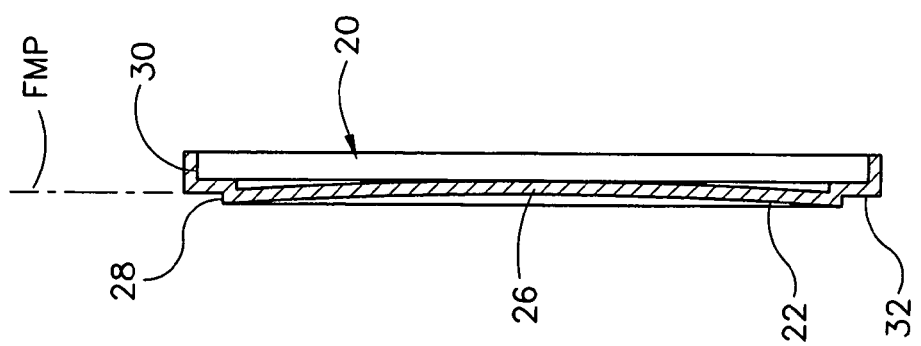
FIG. 2A is side cross-sectional view of the front mold shown in FIG. 1, which is preferably used to form a minus lens.

First with regard to minus lenses, the center thickness is obtained by the design of the front and rear molds 20, 40 in conjunction with the width or length of the ring 50. Referring now to FIG. 2A and addressing the front mold 20, its base 30 has a contacting surface 32 that is substantially planar, and that contacting surface 32 abuts one end 52 of the ring 50 when the edge 28 of the front mold 20 is inserted therein to define a portion of the mold cavity 60. In conjunction, the lens-forming surface 22 of the front mold 20 is concave and defines a nadir 26 or low point, which tangentially intersects a plane FMP defined by the contacting surface 32 of the base 30. The nadir 26 of the lens-forming surface 22 is thus at the same relative height as the contacting surface 32 when the front mold 20 is horizontally disposed. As such, the nadir 26 is aligned with the end of the ring 50 when the contacting surface 32 abuts the end 52 of the ring 50.

Figure 2B:
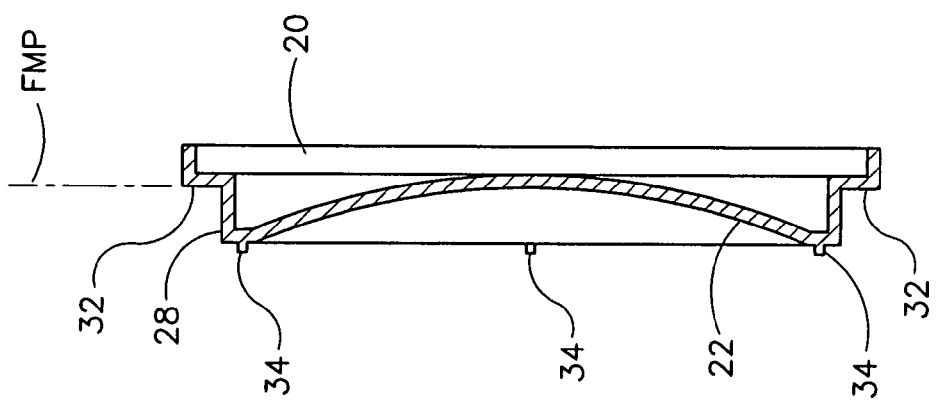
FIG. 2B is an alternative design of the front mold shown in FIG. 2A, which is preferably used to form a plus lens.
Figure 2C:
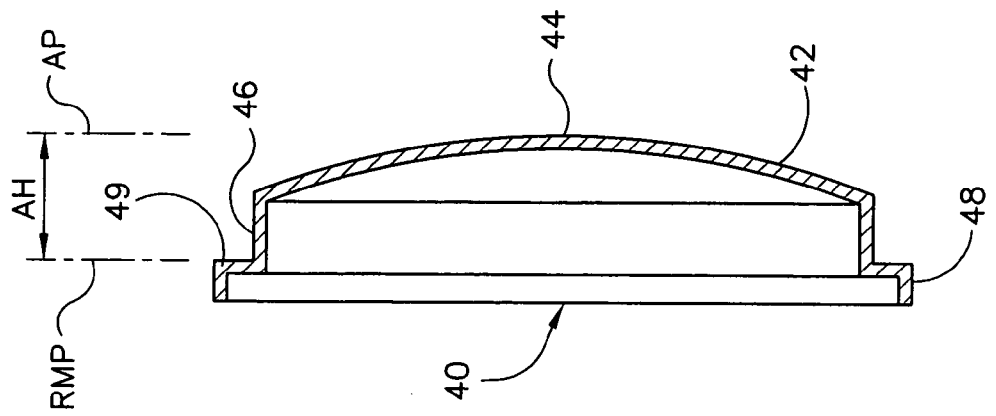
FIG. 2C is side cross-sectional view of the rear mold shown in FIG. 1.

As shown in FIG. 2C, the flange 48 of the rear mold 40 has an engaging surface 49 that is substantially planar to abut the respective end 52 of the ring 50 when the mold cavity 60 is formed. The lens-forming surface 42 of the rear mold 40 has an apex 44, in which a plane AP tangential to the apex 44 is substantially parallel to and spaced apart from a plane RMP defined by the engaging surface 49. The separation or distance between the plane AP tangential to the apex 44 and the plane RMP defined by the engaging surface 49 is called the back mold apex height AH.

Also, the opposed ends 52 of the ring 50 are spaced apart by a ring height RH. As one skilled in the art appreciates, the ring height RH establishes the separation between the engaging surface 49 of the rear mold 40 and the contacting surface 32 of the front mold 20. Correspondingly, the ring height RH is a parameter used to set the center thickness of the mold cavity 60, and thus the lens formed therein. That is, for this embodiment, the center thickness of the mold cavity 60 equals the ring height RH minus the back mold apex height AH, as the nadir 26 of the lens-forming surface 22 of the front mold 20 is aligned with one end of the ring 50. Thus, if the ring height RH is three millimeters (3 mm) and the back mold apex height AH is two millimeters (2 mm), then the center thickness—the separation between the apex 44 of the rear mold 40 and the nadir 26 of the front mold 20—is one millimeter (1 mm).

As shown in FIG. 3A, the assembled casting device 10 shows the relative position of the components in establishing the center thickness for the mold cavity 60. Specifically, one end 52 of the ring 50 abuts the contacting surface 32 of the front mold 20 and the opposed end 52 abuts the engaging surface 49 of the rear mold 40. The nadir 26 of the front lens-forming surface 22 is spaced apart a desired distance—the center thickness—from the apex 44 of the rear lens-forming surface 42 when the molds 20, 40 are coupled together. Stated differently, the plane AP tangential to the apex 44 is spaced apart from the plane FMP defined by the contacting surface 32 and tangentially intersects the nadir 26 at a distance substantially equivalent to the desired center thickness of the mold cavity 60. Thus, the apex 44 and the nadir 26 of the respective lens-forming surfaces 22, 42 in the mold cavity 60 are spaced apart at the desired center thickness for the lens to be formed.

As one skilled in the art appreciates, changing the dimensions of the components correspondingly alters the center thickness of the mold cavity 60. Any of the components can be modified. Although viable, currently the least desirable option is to change the position of the nadir 26 relative to contacting surface 32 of the front mold 20. A more desirable option is using rings 50 each having a different ring height RH to change the center thickness. The presently preferred design, however, is to vary the back mold apex height AH among different molds to change the center thickness of the mold cavity 60. Thus, in this latter design, the front mold 20 uses the same design shown in the illustrated embodiment and a "universal" or "one-size" ring that has the same dimensions regardless of the strength of the lens to be made; only the rear mold 40 is changed in this latter design and, in particular, the back mold apex height AH is altered among different rear molds 40 to vary the center thickness of the mold cavity 60.

Still another contemplated embodiment to change the center thickness for a selected ring 50, front and rear mold 20, 40 is to include a circular spacer (not shown) between the engaging surface 49 of the rear mold 40 and respective end of the ring 50. The circular spacer has diameter the same as the ring 50 and a fixed width or height, thereby increasing the center thickness of the mold cavity 60 by that width of the circular spacer. For example, a circular spacer having a width of one millimeter (1 mm) disposed between the end of the ring 50 and the engaging surface 49 would correspondingly result in the center thickness of the mold cavity 60—and lens to be formed therein—increasing by one millimeter (1 mm). Circular spacers, accordingly, may reduce the number of components that need to be manufactured to enable an operator to cast all desired dimensions and strength of lenses.

Referring now to FIGS. 2B and 3B, the illustrated front mold 20 includes a plurality of protrusions 34 located adjacent the edge and spaced apart from each other. The protrusions 34 have a height corresponding to a desired edge thickness for the mold cavity 60. For example, if the protrusions 34 have a height of one millimeter (1 mm), then the edge thickness of mold cavity 60 will be at least one millimeter because the protrusions 34 prevent the edges of the front and rear lens-forming surfaces 22, 42 from being closer together than the height of the protrusions 34. The protrusions 34 may be any desired height, including for example 0.75, 1.0, 1.25 millimeters and the like. A person skilled in the art can determine the number of protrusions 34 to use; the currently contemplated embodiment uses thirty-two equally spaced protrusions 34 circumscribing the perimeter of the lens-forming surface 22 of the front mold 20. Fewer protrusions are shown in the drawings for simplicity. It will be appreciated that benefits of this design include the same rear molds 40 and rings 50 that are used to form the minus lenses also being used to form the plus lenses.

The present invention additionally contemplates other methods of forming plus lenses. For example, the ring height RH may be varied to obtain the correct separation between the lens-forming surfaces 22, 42 of the front and rear molds 20, 40, including the edge thickness. Also, the lens-forming surfaces 42 of the rear molds 40 may include the protrusions 34 instead of the front molds, but this option is less desirable given the greater variations in rear mold designs and associated higher cost for a "library" of molds to manufacture all lens variations.

Another relevant parameter in forming a desired lens is the geometric configuration or relationship of its two optical surfaces. When the two lens-forming surfaces 22, 42 are both spherical, the molds 20, 40 do not require any special rotational alignment relative to each other. This is because the respective surfaces have a constant radius along their different axes resulting in the surfaces being symmetric relative to each other.

For other lenses, however, the present invention includes a means for orienting the front and rear molds 20, 40 at a predetermined rotational position with respect to each other. In the illustrated embodiment, the front and rear molds 20, 40 are rotatably movable relative to each other so that the two molds may be positioned at one of a plurality of selected relative rotational orientations. This orienting means thus allows the operator to alter the dimensions or shape of the mold cavity 60 to desired values when either or both of the lens-forming surfaces 22, 42 of the front and rear molds 20, 40 have asymmetric curvature. Examples of asymmetrical lenses that operators may typically cast include the front surface of a lens being spherical with an add power—or less frequently being a piano surface—and, in conjunction or independently, the back surface being cylindrical or toric. A discussion of the features and types of such asymmetrical surfaces may be found in U.S. Pat. No. 6,103,148.

Referring back to FIG. 1, the present invention also comprises an aligning means to allow the operator to appreciate the relative rotation of the two molds 20, 40 and position them accordingly. The aligning means shown in the illustrated embodiment comprises axis marks 90 on the exterior periphery 56 of the ring 50 and an axis-positioning indicator 92 on the front mold 20 or rear mold 40 or both. The axis marks 90 extend from 0° to 180° and the asymmetrical lens-forming surface 22 or 42 is to be positioned in registry with them. If injection molding or similar technique forms the components, the aligning means are preferably etched or formed into the respective dies. Thus, the position indicator 92 and marks 90 are also integrally formed into the components. One skilled in the art will also appreciate that aligning means may alternatively comprise the axis marks being located on one or both of the front and rear molds 20, 40 and an axis-positioning indicator on the ring 50. Other methods of visually indicating the rotational position of the molds relative to each other may also be used.

In preparing to cast the lens, the operator locates the position indicator 92 at a desired orientation relative to the axis marks 90 on the ring 50 either before the front and rear molds 20, 40 are joined to the ring 50 or afterwards (e.g., by being aligned before they are put into the ring, then pushed into the ring.) the molds relative to each other once they are coupled to the ring 50). The operator, thus, is able to position the two molds at a desired rotational location easily using the aligning means.

When the operator joins the ring 50 and the two molds 20, 40 together after selecting them, it is preferred that a connecting means exists so that the components do not inadvertently separate during the lens casting process. Such a connecting means can take numerous forms known in the art, including the interior periphery 54 of the ring 50 and the edge 28/rim 46 having a tight frictional fit. Other connecting means are also contemplated (not shown), including designs in which the two molds 20, 40 snap into place within the ring 50 or in which an external clip or containing device is used to hold the components together.

In still another contemplated embodiment, the front and rear molds 20, 40 are formed as a single unit so they are integrally joined to each other. This may occur during the forming process (i.e., during injection molding) so that the operator receives a preformed molding structure in which the front and rear molds 20, 40 are stationarily positioned relative to each other. This unitary design, however, has less flexibility than interchanging the ring 50 and the front and rear molds 20, 40.

As noted above, once the front and rear molds 20, 40 are stationarily positioned together, a resin, such as a monomer or other lens-forming fluid, is added or injected into the mold cavity 60 via the feed and vent openings 70, 72 through the ring 50, and then cured. Referring now to FIG. 5, a fill bag 80 or the like containing a fluid such as monomer may be interconnected to the feed opening 70 or its extender 74. More specifically, the fill bag 80 has an interior and an injection port 82 detachably connectable to the feed opening 70. When the injection port 82 is linked to the feed opening 70, the monomer located within the interior of the fill bag 80 may flow through the port into the mold cavity 60.

The injection port 82 and the feed opening 70 are preferably designed to complementarily engage each other. That is, the tip 84 of the injection port 82 is of a size to be complementarily received within the feed opening 70 or its extender 74 to form a fluid-tight seal therebetween.

One consideration that a person skilled in the art takes into account in casting lenses is the flow characteristics of the monomer traversing from the fill bag 80 into the mold cavity 60. A primary concern is to avoid the introduction of air bubbles and ensure that any such bubbles escape from of the mold cavity 60 before the curing begins; otherwise, the formed lens may be unacceptable if an air bubble discontinuity exists in the final product. In addressing this issue, the size of the feed opening 70 should be of a dimension and positioned to promote laminar flow when filling the mold cavity 60. The fill opening 70 is preferably oriented to direct the monomer along the side of the mold cavity 60 during the initial filling. As noted above, the vent opening 72 is also preferably located at the top of the mold cavity 60 (i.e., at the 12:00 o'clock position) to vent air within the cavity 60 when displaced by the injected or incoming monomer. The vent opening 72 being located at the top also allows any bubbles to escape before the curing process begins.

Another consideration regarding injecting monomer involves positioning the mold cavity 60 so that the add power (not shown) is oriented to have its flat top portion substantially upright or vertical during filling the mold cavity 60. This orientation assists in preventing air bubbles within the monomer from being trapped by this discontinuity in the lens-forming surface 22 of the front mold 20. Bubbles are more likely to remain in the mold cavity 60 if, for example, the flat top is horizontally oriented.

Referring again to FIG. 5, the fill bag 80 is at least partially constructed of a deformable surface on which the operator directs a compressive force so that one wall of the bag 80 moves inwardly toward the opposed wall. When that compressive force is applied, the fluid monomer located within the interior is forced toward and out of the injection port 82 to enter the mold cavity 60 via the feed opening 70. In constructing a system necessitating minimal capital investment, the illustrated embodiment is inexpensively designed and relies on the operator hand squeezing the bag 80 to fill the mold cavity 60.

Other means of injecting monomer into the mold cavity 60 are contemplated. Examples of such systems using a deformable bag to fill the mold cavity 60—particularly for more complex casting designs—is disclosed in U.S. patent application Ser. No. 10/095,130, filed on Mar. 11, 2002 and entitled "Method and Apparatus for Dispensing a Fluid". Monomer fill systems similar to the design disclosed in U.S. Pat. No. 6,103,148 is another option.

Once monomer fills the mold cavity 60, the bag 80 is separated from the mold and then the monomer is cured (as discussed in more detail below).

Mold Materials

Materials suitable for forming the molds of the invention include a variety of thermoplastic or substantially thermoplastic materials that can be injection molded. The materials are preferably optically transparent. Suitable amorphous thermoplastic materials include, but are not limited to, polycarbonate, acrylics, polystyrene, CAB (cellulose acetate butyrate), polyesters, and combinations thereof. In general it is also desirable that the thermoplastic material be selected such that it will not be attacked by coating and/or monomer material used to form the lens. In general higher molecular weight analogs of thermoplastics are desirable because they are typically more resistant to coatings and monomers used to form the lenses.

Amorphous thermoplastics can provide the advantage that, unlike crystalline thermoplastics, they tend to maintain an optical-quality surface for long periods of time, and so have a long shelf life with proper storage. In contrast, crystalline thermoplastics, such as polypropylene undergo dimensional changes after they are injection molded. These dimensional changes occur due to the polymer's attempt to arrange itself in a more crystalline structure. The result of this rearrangement is that the plastic part can have an uneven, non-optical surface. In contrast, amorphous thermoplastics will typically retain the shape they took on during the injection molding process. Not all thermoplastics are either 100% crystalline or 100% amorphous, so the scope of this disclosure ranges from "substantially amorphous" to totally amorphous materials, meaning thermoplastics that contain mostly amorphous materials.

Pre-Release Control

As one skilled in the art will appreciate, the lens formed for a high power lens (either "high plus" or "high minus") can have substantial differences in thickness between the middle of the lens and the edge of the lens. The lens forming material will have some shrinkage during the cure process, and large differences in thickness will lead to large differences in shrinkage. When the outer periphery of the lens shrinks substantially more than the inner portion of the lens (such as with a high minus lens), or when the inner portion of the lens shrinks more than the outer periphery of the lens (such as with a high plus), the portion of the lens with higher shrinkage will actually pull away from one or more of the mold surfaces, resulting in a condition known to those in the optical industry as "pre-release."

To reduce pre-release in high power lenses using glass molds, a new set of front and back molds have to be made in smaller diameters. Accordingly, new gasket sets must also be made for the new molds. Specifically, in the present invention, pre-release in high power lenses is controlled by changing only the front mold geometries without changing the back mold or the ring used to assemble the front and back molds together. In fact, the rings and back molds are the same ones used for the rest of the lens powers, thus no additional small diameter back mold inventory is required to accommodate high power lens manufacture.

Figure 6A:
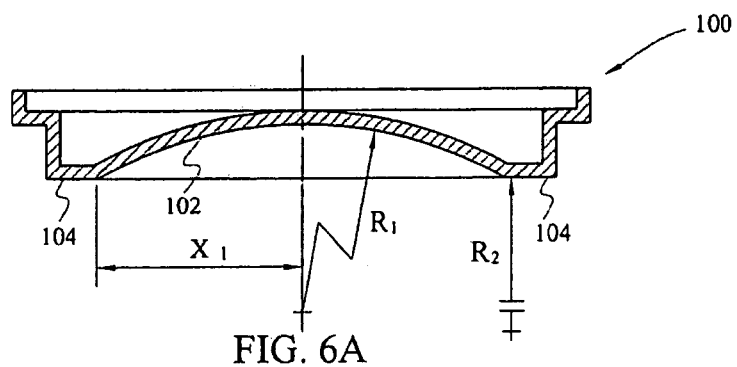
FIG. 6A is a side cross-sectional view of an alternative design of a high plus front mold shown in FIG. 1.

FIG. 6A shows a cross-sectional view of a front mold 100 for a high plus lens. Relative to a standard front mold 20 for a plus lens disclosed in FIG. 2B, the geometry of the lens forming surface has been changed from a uniform spherical shape to a mold that comprises a center region 102 and an outer region 104. Center region 102 comprises a spherical surface with a radius of curvature R1. Center region 102 extends from the centerline of mold 100 to a distance X1 away from the centerline of mold 100, and outer region 104 extends from distance X1 away from the centerline to the outer periphery of the mold 100. Outer region 104 comprises a surface that has a radius of curvature R2 that is substantially greater than R1, which may comprise a surface that is flat (infinite radius of curvature).

When coupled with a standard-shaped rear mold 40, a finished lens 106 made with front mold 100 would have less of a thickness difference between the center and edge of the mold, thereby reducing or eliminating the pre-release of the lens from the mold. Specifically, referring to FIG. 6C, finished lens 106 comprises a first surface 108 formed by contact with regions 102 and 104 of front mold 100, and a second surface 109 formed by contact with standard rear mold 40. The thickness of the cross section of finished lens 106 is a function of the different radii of curvature and loci of the radii of curvature of the surfaces of molds 100, 40. Generally, lens 106 will comprise a maximum thickness at the centerline of the lens, shown in FIG. 6 as distance Y1. On account of the differences in radii of curvature and loci of the radii of curvature, the thickness of the lens will be generally decreasing at increasing distances away from the centerline of the lens 106. The thickness of the lens 106 will decrease up to distance X1 from the centerline of the lens. At distances greater than X1, on account of the shape of region 104 of mold 100, the thickness of the lens will increase with increasing distance from the centerline. The minimum thickness of the lens, denoted as distance Y2 in FIG. 6C, is formed at distance X1 from the centerline of the lens. If region 104 were not present, the minimum thickness would typically exist at the outer periphery of the lens, i.e. the maximum distance away from the centerline of the lens, and would typically be smaller than distance Y2. Accordingly, the difference between the minimum thickness and the maximum thickness is reduced with mold 100, minimizing the potential for pre-release.

Figure 6B:
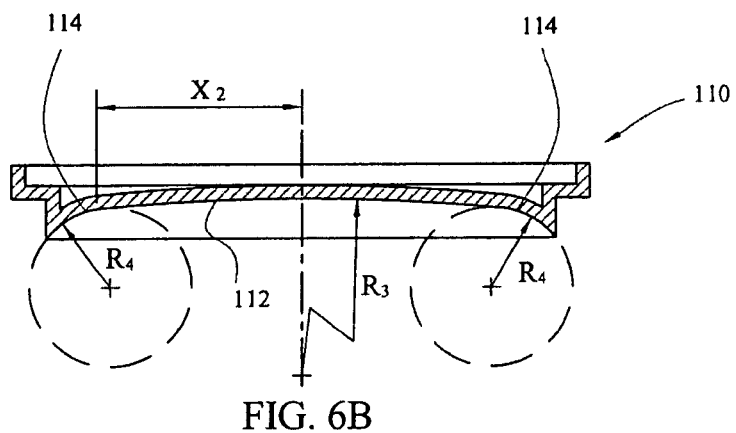
FIG. 6B is a side cross-sectional view of an alternative design of a high minus front mold shown in FIG. 1.
Figure 6C:
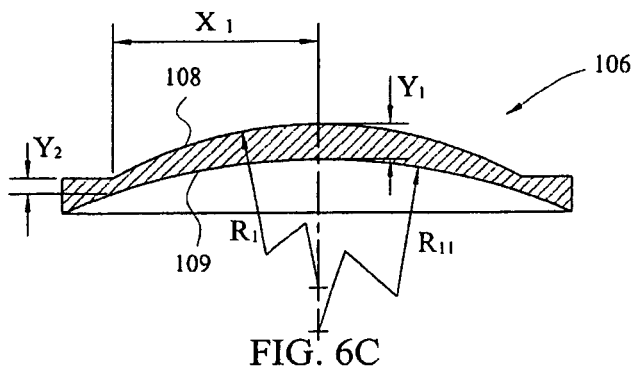
FIG. 6C is a cross-sectional view of a high plus lens formed by the front mold shown in FIG. 6A.
Figure 6D:
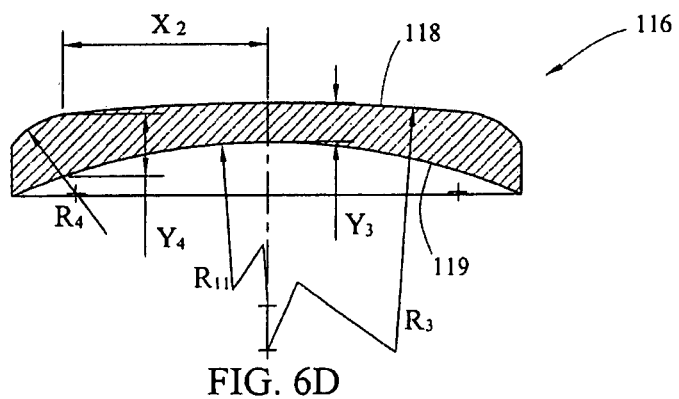
FIG. 6D is a cross-sectional view of a high minus lens formed by the front mold shown in FIG. 6B.

Referring now to FIG. 6B, a cross-sectional view of a front mold 110 for a high minus lens is shown. Relative to a standard front mold 20 for a minus lens disclosed in FIG. 2A, the geometry of the lens forming surface has been changed from a uniform spherical shape to a mold that comprises a center region 112 and an outer region 114. Center region 112 comprises a spherical surface with a radius of curvature R3 and outer region 114 comprises a spherical surface with a radius of curvature R4. Radius R3 is substantially larger than radius R4. Center region 112 extends from the centerline of mold 110 to a distance where a tangent to radius R3 aligns with a tangent to radius R4, denoted on FIG. 6B as distance X2.

When coupled with a standard-shaped rear mold 40, a finished lens 116 made with front mold 110 would have less of a thickness difference between the center and edge of the mold, thereby reducing or eliminating the pre-release of the lens from the mold. Specifically, referring to FIG. 6D, finished lens 116 comprises a first surface 118 formed by contact with regions 112 and 114 of front mold 110, and a second surface 119 formed by contact with standard rear mold 40. The thickness of the cross section of finished lens 116 is a function of the different radii of curvature and loci of the radii of curvature of the surfaces of molds 110, 40. Generally, lens 116 will comprise a minimum thickness at the centerline of the lens, shown in FIG. 6D as distance Y3. On account of the differences in radii of curvature and loci of the radii of curvature, the thickness of the lens will be generally increasing at increasing distances away from the centerline of the lens 116. The thickness of the lens 116 will increase up to distance X2 from the centerline of the lens, where the thickness of the lens is a maximum value of Y4. At distances greater than X2, on account of the shape of region 114 of mold 110, the thickness of the lens will decrease with increasing distance from the centerline. If region 114 were not present, the maximum thickness of lens 116 would typically exist at the outer periphery of the lens, i.e. the maximum distance away from the centerline of the lens, and would typically be greater than distance Y4. Accordingly, the difference between the minimum thickness and the maximum thickness is reduced with mold 110, minimizing the potential for pre-release.

Certain aspects of the invention are directed to casting devices comprising a ring having an interior periphery and a plurality of front molds, each front mold formed of a plastic and having a lens-forming surface. The front molds provide an edge circumscribing the lens-forming surface that is sized to be complementarily received within a portion of the interior periphery of the ring, and a base having dimensions greater than the interior periphery. The casting devices further include a rear mold formed of a plastic and having a lens-forming surface, the rear mold configured to be paired with each of the plurality of front molds. The edge of each of the front molds and the rim of the rear mold are configured to be received by the ring, the lens-forming surfaces of the front and rear molds and the ring form a mold cavity which has dimensions of a desired lens formable therein. The plurality of front molds are configured to form lenses of different effective diameters.

Figure 7A:
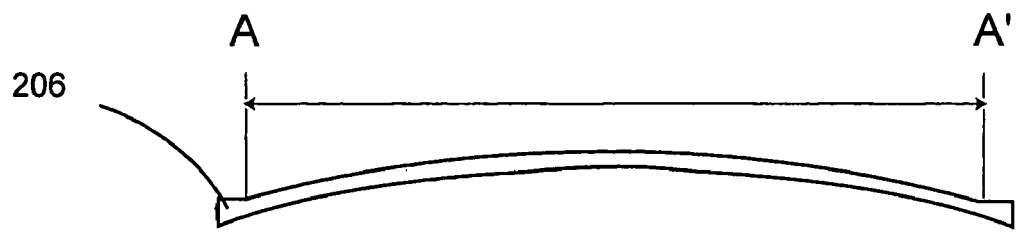
FIG. 7A is a cross-sectional view of a first lens.
Figure 7B:
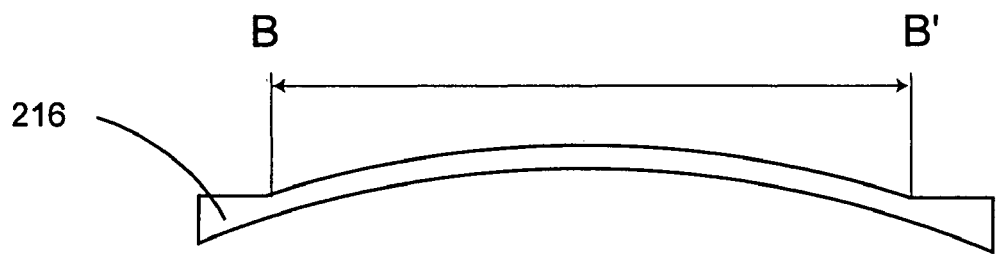
FIG. 7B is a cross-sectional view of a second lens made using the same rear mold as the lens shown in FIG. 7A.
Figure 7C:
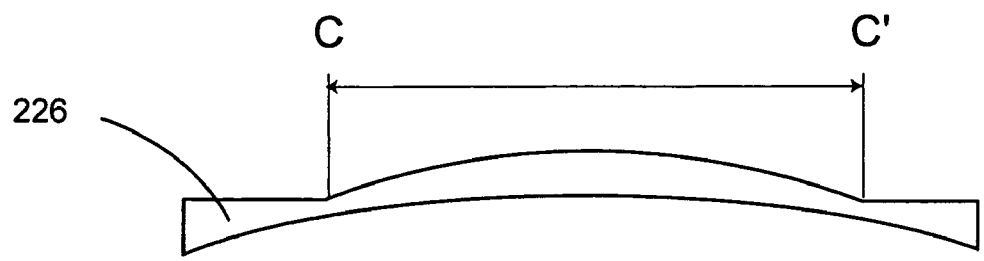
FIG. 7C is a cross-sectional view of a third lens made using the same rear mold as the lens shown in FIG. 7A.

The molds of the present invention may be designed to cast lenses of different powers, as well as lenses of different effective diameters using a common rear mold. The effective diameter corresponds to the diameter of the lens that is designed to be a portion of the finished lens after it has been trimmed to fit a pair of eyeglasses. Referring now to FIGS. 7A to 7C, the effective diameters of three lenses made using three different front molds and a common rear mold are depicted. In FIG. 7A, the lens 206 has an effective diameter A–A'; in FIG. 7B the lens 216 has an effective diameter of B–B'; while in FIG. 7C the lens 226 has an effective diameter of C–C'. It will be observed that lenses 206, 216, and 226 can all be common rear mold. Thus, each of front molds 20, 100, and 110 can be used with the same rear mold 220 to make lenses of three different effective diameters.

Mold Coatings

In certain embodiments of the invention a coating is applied to the interior of the mold prior to forming the lens. In some embodiments the coating is applied to interior portions of the mold by dip coating, spin coating, spray coating, flow coating, electrostatic spray, roll coating, modified roll coating, print coating, or other coating method. The coating may then optionally also be subjected to a "precure" to partially cure the coating so that it will stay in place and not move during subsequent steps in the process.

The molds can be coated with any of a variety of coating formulations, provided that the coating does not chemically attack the mold. The coating formula can include, for example, acrylate functional materials capable of crosslinking, sol-gels, nanoparticle-based coatings, initiators or catalysts capable of initiating the reaction of acrylates, flow or leveling agents, defoamers, stabilizers, UV absorbers, antioxidants, dyes, and possibly solvents. Some solvents can be used in the coating formulation, as long as such formulations do not substantially attack the mold before the formulation has cured. Solvents that could be used would include alcohols, glycols ethers, etc. Solvents that would be less acceptable for use would include lower molecular weight ketones such as acetone, methyl ethyl ketone, methyl isobutyl ketone (MIBK), cyclohexanone; acetates; aromatic solvents such as benzene, xylenes; low MW hydrocarbons such as hexane, etc.

Suitable coatings include those that provide a hardcoat for improved scratch-resistance, a tintable coat for the purpose of making sunglasses or other "fashion" tints, a UV coat to prevent certain wavelengths of UV light to pass through the lens, an AR ("anti-reflective") coat to prevent glare, or any other type of ophthalmic coating. The coating should be selected so that it does not attack the mold material. Such coatings remain on the mold temporarily and are transferred to the finished lens during the lens curing step. Thus, the coating is applied to the mold with the intent that it becomes an integral part of the finished lens.

In general it is important that the coating not attack the interior of the mold and be readily releasable from the mold. Accordingly, coating formulations should not have enough solvating power to attack the mold. As one skilled in the art would appreciate, the coatings could be based on UV-curable acrylic, sol-gel, or other composition types. The coating preferentially has a more complete cure at the mold/coating interface than at the coating/air interface.

In an acrylic coating, the major constituents of the protective coating include multifunctional acrylates or methacrylates, including tri-, tetra-, penta-, and hexafunctional materials capable of providing high levels of cross-linking. The molecular weight of these constituents must be high enough to prevent attack on the mold. The protective coating could contain a small amount of a low-viscosity diluent with at least two ethylenic groups to adjust for coating viscosity, but the majority of the formulation will contain higher molecular weight, higher viscosity materials. Examples of materials commonly used in coatings are in the attached table and illustrate the importance of the use of appropriate materials with plastic molds.

Lens Forming Formulations

The molds of the present invention are suitable for use with a variety of resin compositions to form finished optical lenses. In general, molds made in accordance with the invention are well suited to the use of radiation initiated curing processes, such as by exposure to ultraviolet or visible light, but can also include thermally cured materials if the thermal cure temperature is below the glass transition temperature $T_g$ of the mold.

Suitable lens forming compositions include materials having low cure temperatures, which cure quickly, including acrylates and methacrylates. In some implementations epoxies can be used.

It is generally desirable to have the lens forming formulation be inert or substantially inert to the mold itself. However, in certain circumstances the lens material is not inert to the mold material, in which case an intermediate, transferable, coating material can be used to prevent degradation of the mold. Typically the coating is applied first to the interior of the mold, cured or partially cured, and then the primary lens forming formulation is added.

Any of a variety of photocleavable or thermal initiators can be used. The level of photo initiator or thermal initiator used is typically low (less than 5%) and would not have a significant impact on the chemical aggressiveness of the lens formulation on the mold. In general, lower temperature curing of the lens is preferred, accomplished with UV or visible light photo initiators, low initiation temperature thermal initiators or a combination of both. A variety of light sources can be used, including those with output in the UV-A, UV-B and visible ranges, or combinations thereof.

Depending on the choice of thermoplastic materials used, there will be certain chemistries and/or process parameters that will allow the mold to be used satisfactorily. Based on the simple chemical notion that "like dissolves like," each different type of thermoplastic material can be used without issue with certain ingredients typical of a coating formulation and/or lens formulation. In order to determine if a raw material (or group of raw materials in a formulation) will be chemically compatible with mold material, any number of tests can be employed:

One screening test for chemical compatibility involves a representative sample of the thermoplastic material to be placed in close contact with the chemical to be tested. This "close contact" can involve soaking the thermoplastic in the test solution, or the test solution can be allowed to sit on top of the thermoplastic material. The time and temperature during which the two materials are in contact are controlled variables in the test. After the test period is over, all excess test solution is removed from the thermoplastic material by simple wiping, and the thermoplastic is evaluated for any damage by measuring any change in physical appearance, any change in percent transmittance, any change in refractive index, any change in tensile strength, any change in flexibility, any change in weight or size, any change in surface smoothness, or any change in optical properties.

In certain embodiments of the invention, the formulation used to form the lenses and the material used to form the mold is selected based upon solubility properties of the mold material and the lens forming formulation. In general it is desirable to have low solubility of the mold material in the lens forming formulation. Although it is difficult to determine solubility of a solid material in a resin, the durablity of the mold can be used as an indication of solubility. Applicants have found that the lens forming formulation should be selected such that the resin does not significantly degrade optical properties of the mold surface upon exposure to the resin.

Any significant change in any of the above properties of the thermoplastic constitutes damage to the material, and the thermoplastic material cannot be used with that test solution. However, it is still quite possible that although a certain ingredient is known to attack a particular thermoplastic material, that ingredient can still be used in small amounts in solution, provided that the other components are compatible with the thermoplastic. Numerous examples of such scenarios are provided for in this patent.

Methods for Casting and Curing Lenses

The present invention is also directed to methods for casting lenses. For an initial step, the method of the present invention involves providing the ring 50 and front and rear molds 20, 40. Although it is contemplated that the components be pre-connected together as a unit and provided to the operator, it is preferred that the ring 50 and front and rear molds 20, 40 are preferably combined or coupled together by the operator at the lens manufacturing location to form the mold cavity 60. When the operator receives the prescription of a spectacle lens, he or she selects the front and rear molds 20, 40 that, together, form a mold cavity 60 having the dimensions of the desired lens. In the illustrated embodiment, the ring is a "one-size" or "universal" ring and used to manufacture all lenses, whether plus or minus and regardless of power.

To that end, the ring 50 and front and rear molds 20, 40 are movable between a stored position and a molding position. In the stored position, the components are separated from each other, in which molds having the same characteristics are stored together in designated areas or bins. In the molding position, the protrusion 46 of the rear mold 40 receives the edge 28 of the front mold 20 to form the mold cavity 60 after the operator retrieves the correct molds from the designated storage areas.

It is contemplated using computer or other system (not shown) to assist the operator in selecting the correct molds 20, 40 when preparing to cast a lens. As one example, the present invention contemplates that the operator enters the parameters of the lens to be formed (e.g., the prescription including add power) into a computer or the like. Algorithms in an associated computer program determine the appropriate front and rear molds 20, 40 to be used to form the desired lens and then provide an output indicating this information. As one optional variation, such a system may additionally illuminate a light or provide another indicator at the storage stations above the specific location where the appropriate molds 20, 40 are stored. The indicators assist the operator in locating the appropriate molds to reduce the chance of the operator inadvertently picking an incorrect mold to make the lens. Yet another option is to use a bar code or other tracking system (not shown) on the outer surfaces of the molds 20, 40 that the system scans to verify that the two proper molds are being used.

After the operator locates the front and rear molds 20, 40, obtains a ring 50, and is ready to join the components together, the output of the optional computer system may further assist the operator by indicating additional positioning and aligning information. As discussed above, in the illustrated embodiment the front and rear molds 20 are rotatably movable relative to each other so that the two molds 20, 40 are at one of a plurality of selected rotational orientations relative to each other. The computer may provide an output indicating the orientation of the two molds 20, 40 relative to each other when the lens-forming surfaces 22, 42 of the respective molds have asymmetric curvature. For the illustrated embodiment, the computer preferably indicates the appropriate location of the axis-positioning indicator 92 to be aligned on the axis marks 90.

As to the positioning of the molds 20, 40 to obtain the correct center or edge thickness for the mold cavity 60, this parameter is preferably considered in selecting the ring 50 and molds 20, 40, as discussed above. The designated components are preferably manufactured so that when the operator combines or assembles the components together, the mold cavity 60 has the correct thickness without any additional actions.

However, one skilled in the art will appreciate that other means besides a computer system may be used to determine the correct mold to use with the present invention. Notably the present invention utilizing the computer system allows an operator with minimal training and understanding of the principles of lens casting to manufacture successfully lenses when a customer provides a prescription.

After the front and rear molds 20, 40 are joined with the ring 50 to form the mold cavity 60 of the desired dimensions, the operator connects the bag 80 or other source of monomer to the feed opening 70. The operator then injects the monomer into the mold cavity 60.

During filling, the monomer enters via the feed opening 70 while the vent opening 72 allows displaced air to exit the mold cavity 60 to ambient. The filling method used with the present invention minimizes the quantity of monomer wasted and decreases the chances of air bubbles being formed within the lens. If used, the bag 80 may contain a quantity of monomer that is sufficient to form only a single lens or, alternatively, for multiple castings.

Because monomer is a viscous fluid, it will inherently fill the mold cavity 60 at a controlled rate. By design, the fill rate may be further controlled by reducing the cross-sectional area of the feed opening 70 and/or the tip 84 of the bag 80. Since the front and rear molds 20, 40 are formed of plastic, they can be clear or transparent so that the operator may visually observe the monomer entering and filling the mold cavity 60. When the cavity 60 is filled with monomer so that the monomer reaches the vent opening 72 (and thus the top of the extender of the feed opening 70), the monomer source is removed from the ring 50. If necessary, the feed opening 70 is plugged, which may simply involve spot curing the monomer at that location to plug it or using a covering that snaps into the feed opening 70. The vent opening 72, however, preferably remains in communication with ambient during curing.

The monomer within the mold cavity 60 is then cured to form the lens after ensuring that no bubbles are present. The lens material, depending on the formulation, can be cured with a variety of methods, including light, heat, or combinations thereof. If a free-radical mechanism is employed, then the lens can be cured via either UV light, visible light, or heat, depending on the initiator. It is also possible to cure the lens with a combination of these curing techniques. These curing methods can be used either simultaneously or sequentially.

Both curing techniques can be used with a variable rate of cure (i.e., ramp-up, progressive cure.) After the cure cycle is complete (typically from two to ten minutes) the lens is removed from the molds simply be removing the gasket, and lifting the molds away from the lens.

Methods of Making Lenses Using Plastic Molds

The present invention is also directed to methods of casting lenses using plastic molds, which may be used with the exemplary embodiment discussed immediately above or another design (i.e., a T-gasket design that uses plastic molds instead of glass molds).

When selecting the specific type of material to form the molds, one skilled in the art will appreciate that to be useful in curing monomer, the selected plastic must transmit the curing radiation without melting, deforming, or stretching—at least until after the monomer is substantially cured or polymerized. Although thermal radiation is contemplated as a curing source and falls within the scope of the present invention, one skilled in the art will appreciate that the present invention may be better suited for photo curing.

For photo curing of liquid resins, the desirable plastics include acrylic and methacrylic materials, an example of which is polymethylmethacrylate (PMMA). Some embodiments of available light transmissive PMMA are the OP1 and OP4 products by Cyro Industries, UV-T and V8-25 by Rohm & Haas, and CP-75 from ICI. Other exemplary types of radiation transmissive plastics that may be used with the present invention include amorphous polyesters, amorphous polyamides, amorphous polyurethanes, amorphous polyolefins, amorphous polycarbonates, amorphous polyimides and co-polymers thereof. One skilled in the art will appreciate that these listed plastics are illustrative and the present invention is not limited to these examples.

Another factor that one skilled in the art considers in selecting the plastics to use is that they do not adversely interface or react with the material to be cured. If, for example, it is desired to use polymethylmethacrylate to form the molds based on its cost or physical properties, then compatible monomers include long chain or high molecular weight monomers or prepolymers that do not attack the mold should be used. Alternatively, the monomer desired to be used may be the primary consideration and the plastic forming the molds is chosen based on it being chemically resistant and non-reactive to that selected monomer.

Using plastic to form the molds provides potential benefits over casting systems currently used in the industry. One consideration is that the plastics may be injection molded. There is extensive use and experience in the industry of injection molding polymethylmethacrylate and acrylics using ceramic or metal molds. To that end, the molds may be formed, for example, by fabricating metal dies into which polymethylmethacrylate or other plastic is injection molded in an assembly process having a high throughput. Each of the molds, accordingly, will be formed to the same high tolerances to which the die is formed. Glass molds, in contrast, cannot be fabricated to such exacting standards, so the present invention can cast an ophthalmic lens that is formed to more rigorous criteria. One skilled in the art will further appreciate that the plastic components may be formed using other suitable high throughput methods used in the art for fabricating plastics, in contrast to glass molds that cannot feasibly be mass-produced to the requisite tolerances.

Another consideration with using plastic components is the economic comparison with conventional prior art systems using two glass molds and a gasket. Although glass molds may be repeatedly used up to one hundred times or more, expenses accumulate that are associated with each casting, such as washing and drying that must ensure that the lens-forming surface is not contaminated. In fact, cleaning processes for glass molds are typically laborious, time-consuming and inefficient, involving manual scraping and soaking in noxious solvents. Furthermore, the glass molds must be inspected after each use and cleaned to insure suitability for another lens-making cycle. Plus, many times the glass molds are inadvertently chipped and/or broken before their potential useful life is reached. An associated problem is the occurrence of lens yield loss resulting from unwitting reuse of damaged lens molds, in which the operator sometimes does not discover that a glass mold is damaged until after a casting process has been completed.

Yet another aspect of the present invention involves coating the lens-forming surfaces of the molds with an abrasion-resistant composition that is transferred to the lens when cured. More specifically, the lens-forming surfaces are preferably covered with a composition that transfers in situ to the optical surfaces of the cast lens as a protective coating on the final product. Without such a hard coating on the lens that prevents or resists abrasion, scratching, and marring, the optical quality of the cast spectacle lenses may more easily degrade from haze and poor image quality.

Another example of such an abrasion-resistant coating is disclosed in U.S. Pat. No. 5,049,321. This patent discloses that the coating composition consists substantially of reactants having at least triacrylate functionality, a photoinitiator, and a polymerization inhibitor reactive with oxygen. After applying such a coating composition in the form of an ultraviolet curable liquid to the mold, the coating is subjected to ultraviolet radiation in an oxygen-containing environment such that the coating composition is cured to a semi-cured state. Then, when casting and curing the ophthalmic lens, the monomer is permitted to harden and react with acrylate groups at the coating/lens interface so that the coated lens is removed from the mold with the abrasion-resistant coating adhering thereto as an integral part of the surface of the optical surfaces of the lens. Other similar techniques of forming an abrasion-resistant coating on a cast lens are disclosed in U.S. Pat. Nos. 4,338,269 and 4,758,448.

One skilled in the art will appreciate that, although not necessary, using such an abrasion-resistant coating on the lens-forming surfaces produces a final product that consumers may prefer and that also allows the operator to separate more easily the molds from the lens cast therebetween. To that end, the abrasion-resistant coating may be applied to the lens-forming surfaces of the molds using a process the same as or similar to that disclosed in U.S. patent application Ser. No. 10/075,637, filed on Feb. 12, 2002 and entitled "Methods of Applying a Coating to an Optical Surface". Alternative treatment methods of the molds known in the art include spraying, dipping, brushing, flow coating, spin coating, and the like.

The preferred method involves curing using photo curing, although other curing methods are contemplated in conjunction with or alternatively to light. One primary advantage of photo curing, such as UV radiation, is that the plastic molds do not reach a temperature at which they may melt, deform, or stretch, which is more likely to occur with thermal radiation curing. UV curing methodologies are taught, for example, in U.S. Pat. Nos. 4,919,850; 5,524,419; 5,804,107; 5,981,618; 6,103,148; and 6,241,505.

After the monomer is cured to harden, then the operator removes the cured lens from within the mold cavity. It is contemplated that the plastic components of the present invention will have a one-use life. That is, the molds can be disposable so that there are no problems if the molds are chipped or broken during the removal of the lens from the mold cavity. In fact, breaking the molds may assist in separating the cured lens from the mold cavity 60, as the molds are more brittle than the cured lens so the lens does not also break. One skilled in the art will also appreciate that treating the lens-forming surfaces with abrasion-resistant coatings, such as the compositions disclosed in U.S. patent application Ser. No. 10/712,714 and U.S. Pat. No. 5,049,321, will assist in separating the lens from the mold as well as providing the lens with a protective scratch-resistant barrier. One skilled in the art will further appreciate that the plastic molds of the present invention can be used for more than one casting before their useful life ends.

EXAMPLES

The invention will now be further understood by reference to the following examples. As used in these examples, SR 340 is the monofunctional monomer 2-phenoxyethyl-methacrylate; SR 506 is isobornyl acrylate; SR 150 is ethoxylated bisphenol A dimethacrylate; Ebecryl 1039, which is a urethane monoacrylate; Ebecryl 810, which is a polyester tetraacrylate; CN 131 is a low viscosity aromatic monoacrylate oligomer; and SR 203 is a tetrahydrofurfuryl methacrylate monofuntional cyclic monomer. All numbers below are in parts. The lenses were cured between two acrylic molds. The cure time was 5 minutes (except for the 100% SR 203 formulation, which was cured for 30 minutes). The formulations were photocured.

Examples 1 to 3

Lens Formation Interaction

These examples show how diluting an aggressive formulation component with a non-aggressive component can modify the mold-formulation interaction.

Example 1

The molds for Example 1 were formed of uncoated acrylic. As can be seen from Table 1, the use of a mixture containing more of the less aggressive component (SR 150) than the aggressive component (SR 340) resulted in less lens damage. Lens damage means the lens was deemed to be not optically acceptable. One type of observed lens damage is when a portion of the mold is stuck on the lens after de-molding.

TABLE 1

| Formulation | 1 | 2 | 3 | 4 | 5 | 6 | 7 |
|---|---|---|---|---|---|---|---|
| SR 150 | 100 | 90 | 85 | 80 | 70 | 50 | 0 |
| SR 340 | 0 | 10 | 15 | 20 | 30 | 50 | 100 |
| Photo-initiator | 0.35 | 0.35 | 0.35 | 0.35 | 0.35 | 0.35 | 0.35 |
| Lens Damage | No | No | No | No | Yes (minor) | Yes (Light) | Yes (Heavy) |

Example 2

The molds for Example 2 were formed of uncoated acrylic. As can be seen from Table 2, the use of a mixture containing more of the less aggressive component (SR 150) than the aggressive component (CN 131) had less lens damage.

TABLE 2

| Formulation | 1 | 2 | 3 | 4 | 5 | 6 | 7 |
|---|---|---|---|---|---|---|---|
| SR 150 | 100 | 90 | 85 | 80 | 70 | 50 | 0 |
| CN 131 | 0 | 10 | 15 | 20 | 30 | 50 | 100 |
| Photo-initiator | 0.35 | 0.35 | 0.35 | 0.35 | 0.35 | 0.35 | 0.35 |
| Lens Damage | No | No | No | No | Yes (Minor) | Yes (Light) | Yes (Heavy) |

Example 3

The molds for Example 3 were formed of uncoated acrylic. As can be seen from Table 3, the use of a mixture containing more of the less aggressive component (SR 150) than the aggressive component (SR 203) had less lens damage.

TABLE 3

| Formulation | 1 | 2 | 3 | 4 | 5 | 6 | 7 |
|---|---|---|---|---|---|---|---|
| SR 150 | 100 | 90 | 85 | 80 | 70 | 50 | 0 |
| SR 203 | 0 | 10 | 15 | 20 | 30 | 50 | 100 |
| Photo-initiator | 0.35 | 0.35 | 0.35 | 0.35 | 0.35 | 0.35 | 0.35 |
| Lens Damage | No | No | No | No | Yes (Minor) | Yes (Minor) | Yes (Heavy) |

Examples 4 to 6

Examples 4 to 6 below show the effect of temperature on curing various lens materials. As can be seen, increasing the cure temperature to 50° C. can result in a damaged lens, and sometimes to a milky lens.

Example 4

The molds for Example 4 were formed of uncoated acrylic. As can be seen from Table 4, the higher temperatures at which the lenses were cast resulted in more lens and/or mold damage and haze formation.

TABLE 4

| Formulation | 1 | 2 | 3 | 4 | 5 | 6 |
|---|---|---|---|---|---|---|
| Temperature | Room temp. | 50° C. | Room temp. | 50° C. | Room temp. | 50° C. |
| SR 150 | 100 | 100 | 80 | 80 | 50 | 50 |
| SR 340 | 0 | 0 | 20 | 20 | 50 | 50 |
| Photo-initiator | 0.35 | 0.35 | 0.35 | 0.35 | 0.35 | 0.35 |
| Lens Damage/Haze | No/No | No/No | No/No | Yes/Yes | No/No | Yes/Yes |

Example 5

The molds for Example 5 were formed of uncoated acrylic. As can be seen from Table 5, the higher temperatures at which the lenses were cast resulted in more lens and/or mold damage and haze formation.

TABLE 5

| Formulation | 1 | 2 | 3 | 4 | 5 | 6 |
|---|---|---|---|---|---|---|
| Temperature | Room temp. | 50° C. | Room temp. | 50° C. | Room temp. | 50° C. |
| SR 150 | 100 | 100 | 80 | 80 | 50 | 50 |
| CN 131 | 0 | 0 | 20 | 20 | 50 | 50 |
| Photo-initiator | 0.35 | 0.35 | 0.35 | 0.35 | 0.35 | 0.35 |
| Lens Damage/Haze | No/No | No/No | No/No | Yes/Yes | Yes/No | Yes/Yes |

Example 6

The molds for Example 6 were formed of uncoated acrylic. As can be seen from Table 6, the higher temperatures at which the lenses were cast resulted in more lens and/or mold damage and haze formation.

TABLE 6

| Formulation | 1 | 2 | 3 | 4 | 5 | 6 |
|---|---|---|---|---|---|---|
| Temperature | Room temp. | 50° C. | Room temp. | 50° C. | Room temp. | 50° C. |
| SR 150 | 100 | 100 | 80 | 80 | 50 | 50 |
| SR 203 | 0 | 0 | 20 | 20 | 50 | 50 |
| Photo-initiator | 0.35 | 0.35 | 0.35 | 0.35 | 0.35 | 0.35 |
| Lens Damage/Haze | No/No | No/No | No/No | Yes/Yes | No/No | Yes/Yes |

Example 7

The molds for Example 7 were formed of acrylic. Example 7 shows lens damage comparing coated molds and uncoated molds. Table 7 exhibits the potential advantages of coating the molds prior to filling with formulation and subsequent curing.

TABLE 7

| Formulation | 1 | 1 | 2 | 2 |
|---|---|---|---|---|
| Mold Coated | No | Yes | No | Yes |
| Temperature | Room Temp. | Room Temp. | 50° C. | 50° C. |
| SR 150 | 0 | 0 | 80 | 80 |
| SR 340 | 100 | 100 | 20 | 20 |
| Photo-initiator | 0.35 | 0.35 | 0.35 | 0.35 |
| Damage/Haze | Yes/No | No/No | Yes/Yes | No/No |

Examples 8 to 10

Examples 8 to 10 provide mold-formulation interaction data for molds made from a variety of polymers. The following information can be ascertained from the examples: First, different mold materials behave differently. In addition, coating the molds suitably can help prevent mold and lens formulation interaction, and minimizing the time the lens formulations are in contact with the molds prior to cure is an advantage. The lower the mold and lens formulation temperature is, prior to and during cure, the less likely mold-formulation interaction is to occur. Finally, under suitable conditions it is possible to cure and successfully separate molds and formulations without pre-coating the molds. [For tables 8, 9, and 10, only the test material is listed. The remainder of the formulation in these examples consists of SR-150 and photoinitiator(s). In Examples 8–10, "No" means there was no lens damage as defined in Example 1, "Yes" means lens damage was observed.]

Example 8

Example 8 shows temperature and time as factors in lens manufacture, using acrylic molds.

TABLE 8

| Material | | Ebecryl 1039 | | SR 340 | | CN 131 | | Ebecryl 810 | |
|---|---|---|---|---|---|---|---|---|---|
| % Material | Temp. | Time | Coated | Uncoated | Coated | Uncoated | Coated | Uncoated | Coated | Uncoated |
| 0 | RT | 10 Min. | No | No | No | No | No | No | No | No |
| | | 30 Min. | No | No | No | No | No | No | No | No |
| | | 60 Min. | No | No | No | No | No | No | No | No |

TABLE 8-continued

| | Material | | Ebecryl 1039 | | SR 340 | | CN 131 | | Ebecryl 810 | |
|---|---|---|---|---|---|---|---|---|---|---|
| % Material | Temp. | Time | Coated | Uncoated | Coated | Uncoated | Coated | Uncoated | Coated | Uncoated |
| 10 | RT | 10 Min. | No | No | No | No | No | No | No | No |
|  |  | 30 Min. | No | No | No | No | No | No | No | No |
|  |  | 60 Min. | No | No | No | No | No | No | No | No |
| 30 | RT | 10 Min. | No | No | No | No | No | No | No | No |
|  |  | 30 Min. | No | No | No | No | No | No | No | Yes |
|  |  | 60 Min. | No | No | No | No | No | No | No | Yes |
| 50 | RT | 10 Min. | No | No | No | No | No | Yes | No | Yes |
|  |  | 30 Min. | No | No | No | No | No | Yes | No | Yes |
|  |  | 60 Min. | No | No | No | No | No | Yes | No | Yes |
| 100 | RT | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 0 | 50° C. | 10 Min. | No | No | No | No | No | No | No | No |
|  |  | 30 Min. | No | No | No | No | No | No | No | No |
|  |  | 60 Min. | No | No | No | No | No | No | No | No |
| 10 | 50° C. | 10 Min. | No | Yes | No | Yes | No | No | No | No |
|  |  | 30 Min. | No | Yes | No | Yes | No | No | No | No |
|  |  | 60 Min. | No | Yes | No | Yes | No | No | No | No |
| 30 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 50 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 100 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |

Example 9

Example 9 shows temperature and time as factors in lens manufacture, using polystyrene molds.

Example 10

Example 10 shows temperature and time as factors in lens manufacture, using polycarbonate molds.

TABLE 9

| | Material | | Ebecryl 1039 | | SR 340 | | CN 131 | | Ebecryl 810 | |
|---|---|---|---|---|---|---|---|---|---|---|
| % Material | Temp. | Time | Coated | Uncoated | Coated | Uncoated | Coated | Uncoated | Coated | Uncoated |
| 0 | RT | 10 Min. | No | No | No | No | No | No | No | No |
|  |  | 30 Min. | No | Yes | No | Yes | No | Yes | No | Yes |
|  |  | 60 Min. | No | Yes | No | Yes | No | Yes | No | Yes |
| 10 | RT | 10 Min. | No | No | No | Yes | No | Yes | No | No |
|  |  | 30 Min. | No | Yes | No | Yes | No | Yes | No | Yes |
|  |  | 60 Min. | No | Yes | No | Yes | No | Yes | No | Yes |
| 30 | RT | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 50 | RT | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 100 | RT | 10 Min. | Yes | Yes | Yes | Yes | No | Yes | No | Yes |
|  |  | 30 Min. | Yes | Yes | Yes | Yes | No | Yes | No | Yes |
|  |  | 60 Min. | Yes | Yes | Yes | Yes | No | Yes | No | Yes |
| 0 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 10 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 30 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 50 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 100 | 50° C. | 10 Min. | Yes | Yes | Yes | Yes | No | Yes | No | Yes |
|  |  | 30 Min. | Yes | Yes | Yes | Yes | No | Yes | No | Yes |
|  |  | 60 Min. | Yes | Yes | Yes | Yes | No | Yes | No | Yes |

TABLE 10

| Material | | | Ebecryl 1039 | | SR 340 | | SR 203 | | SR 506 | |
| --- | --- | --- | --- | --- | --- | --- | --- | --- | --- | --- |
| % Material | Temp. | Time | Coated | Uncoated | Coated | Uncoated | Coated | Uncoated | Coated | Uncoated |
| 0 | RT | 10 Min. | No | No | No | No | No | No | No | No |
|  |  | 30 Min. | No | No | No | No | No | No | No | No |
|  |  | 60 Min. | No | No | No | No | No | No | No | No |
| 10 | RT | 10 Min. | No | No | No | No | No | No | No | No |
|  |  | 30 Min. | No | No | No | No | No | No | No | No |
|  |  | 60 Min. | No | No | No | No | No | No | No | No |
| 30 | RT | 10 Min. | No | No | No | No | No | Yes | No | No |
|  |  | 30 Min. | No | No | No | No | No | Yes | No | No |
|  |  | 60 Min. | No | Yes | No | Yes | No | Yes | No | Yes |
| 100 | RT | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No* | Yes* |
| 0 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 10 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 30 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 100 | 50° C. | 10 Min. | No* | Yes* | No | Yes | No | Yes | No | Yes |
|  |  | 30 Min. | No* | Yes* | No | Yes | No | Yes | No* | Yes* |
|  |  | 60 Min. | No* | Yes* | No | Yes | No | Yes | No* | Yes* |

*During the hold period attack on the uncoated side caused it to leak. The coated side exhibited no evidence of attack.

Although the present invention has been described with reference to specific details of certain embodiments thereof, it is not intended that such details should be regarded as limitations upon the scope of the invention except as and to the extent that they are included in the accompanying claims.

What is claimed is:

1. A casting device, comprising:
    a. a ring having an interior periphery;
    b. a plurality of front molds, each front mold formed of a plastic and having a lens-forming surface, and the front molds providing an edge circumscribing the lens-forming surface that is sized to be complementarily received within a portion of the interior periphery of the ring, and a base having dimensions greater than the interior periphery; and
    c. a rear mold formed of a plastic and having a lens-forming surface, the rear mold configured to be paired with each of the plurality of front molds, a rim circumscribing the lens-forming surface that is sized to be complementarily received within a portion of the interior periphery of the ling, and a flange having dimensions greater than the interior periphery;
    wherein when the edge of each of the front molds and the rim of the rear mold are configured to be received by the ring, the lens-forming surfaces of the front and rear molds and the ring form a mold cavity which has dimensions of a desired lens formable therein; and
    wherein the plurality of front molds are configured to form lenses of different effective diameters.

2. The casting device of claim 1, wherein the ring comprises plastic.

3. The casting device of claim 1, wherein the ring further defines a feed opening and a vent opening therethrough in fluid communication with the mold cavity.

4. The casting device of claim 3, wherein, when the front and rear molds are disposed upright, the vent opening is positioned at substantially the top center.

5. The casting device of claim 3, wherein the mold cavity is substantially is substantially circular in plan view and the feed opening is offset from the vent opening between approximately fifteen to ninety degrees.

6. The casting device of claim 2, wherein the ring has opposed ends, wherein the base of the front mold has a contacting surface that is substantially planar, and wherein the contacting surface and one end of the ring abut when the mold cavity is formed.

7. The casting device of claim 6, wherein the lens-forming surface of the front mold is concave and defines a nadir, wherein the nadir tangentially intersects a plane defined by the contacting surface of the base.

8. The casting device of claim 7, wherein the flange of the rear mold has an engaging surface that is substantially planar and wherein the engaging surface and one end of the ring abut when the mold cavity is formed.

9. The casting device of claim 8, wherein the lens-forming surface of the rear mold has an apex so that a plane tangential to the apex is substantially parallel to and spaced apart from a plane defined by the engaging surface, the separation between the plane tangential to the apex and the plane defined by the engaging surface is the back mold apex height.

10. The casting device of claim 9, wherein the ends of the ring are spaced apart by a ring height, the ring height being the sum of the back mold apex height and a desired center thickness for the mold cavity.

11. The casting device of claim 8, wherein the lens-forming surface of the front mold further comprises a plurality of protrusions each located adjacent the edge, the protrusions having a height corresponding to a desired edge thickness for the mold cavity.

12. The casting device of claim 1, wherein the front mold is rotatable relative to the rear mold so that the two molds are at one of a plurality of selected rotational orientations relative to each other so as to alter characteristics of the mold cavity when the lens-forming surfaces of the respective front and rear molds have asymmetric curvature.

* * * * *

UNITED STATES PATENT AND TRADEMARK OFFICE
CERTIFICATE OF CORRECTION

PATENT NO.        : 7,114,696 B1                                          Page 1 of 1
APPLICATION NO.   : 11/215361
DATED             : October 3, 2006
INVENTOR(S)       : Kai Su et al.

It is certified that error appears in the above-identified patent and that said Letters Patent is hereby corrected as shown below:

In the Claims:

In column 23, claim 1, line 51, after "periphery of the", delete "ling" and insert --ring--;

In column 24, claim 5, line 30, after "is substantially", delete the second instance of "is substantially".

Signed and Sealed this

Sixteenth Day of June, 2009

JOHN DOLL
*Acting Director of the United States Patent and Trademark Office*